Patented May 9, 1950

2,506,696

UNITED STATES PATENT OFFICE 2,506,696 d-(a)-PENICILLOATES

Oskar Wintersteiner, New Brunswick, N. J., assignor to E. R. Squibb & Sons, New York, N. Y., a corporation of New York No Drawing. Application December 20, 1945, Serial No. 636,265

2 Claims. (Cl. 260—302)

This invention relates to compounds of the general formula

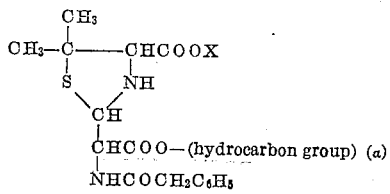

wherein X is a member of the class consisting of H, ammonium groups (including hydrocarbon-substituted ammonium groups), and hydrocarbon groups, and the penicilloic-acid residue is of the particular stereoisomeric form mainly resulting on alcoholysis (or mild alkaline hydrolysis) of penicillin G. This stereoisomeric form is herein designated by "d(a)" directly preceding the term "penicilloate," such designation having been accepted by the interested chemical research groups in this country. The invention relates especially to compounds of the aforementioned general formula wherein the various hydrocarbon groups are primary alkyl or primary aralkyl groups. The synthesis of the compounds of this invention will provide potential intermediates for the synthesis, and precursors in the mold production, of penicillin and related chemotherapeutic agents.

The compounds of this invention wherein X is H have been obtained by alcoholysis of sodium-penicillin G; and the resulting a-esters have been converted into ammonium salts by treatment with ammonia and amines, as well as further esterified by treatment with diazomethanes.

The following examples are illustrative of the invention:

EXAMPLE 1

α-methyl-d(a)-penicilloate G 90 mg. crystalline sodium-penicillin G (cf. Wintersteiner et al. application Serial No. 540,140, filed June 13, 1944, now Patent No. 2,461,949, dated February 15, 1949) is dissolved in 10 ml. absolute methanol. After standing 25 hours at room temperature—during which time its $[a]_D^{23}$ falls from $+304°$ to $+157°$—most of the methanol is removed by vacuum distillation; water is added to the residue; the solution is acidified to pH 2 with phosphoric acid; and the acidified solution is extracted with several portions of ether. The (combined) ether extract is dried over $Na_2SO_4$, and then filtered; most of the solvent is removed by distillation; 50 ml. benzene is added to the residue; and distillation is continued in vacuo until the volume reaches about 20 ml. The resulting solution is lyophilized, yielding the α-methyl-d(a)-penicilloate G as a fluffy white product melting at about 100° C. (with gas evolution) and having an $[a]_D^{23}$ of $+104°$ (in methanol). Its analysis (C, 55.83%; H, 6.37%; N, 7.74%, and $OCH_3$, 8.58%) is in agreement with that calculated for $C_{17}H_{22}O_5N_2S$ (C, 55.70%; H, 6.05%; N, 7.65%; and $OCH_3$, 8.47%).

EXAMPLE 2

The benzylamine salt of α-methyl-d(a)-penicilloate G 192 mg. α-methyl-d(a)-penicilloate G is dissolved in 5 ml. ether, the solution is filtered, and 0.055 ml. benzylamine in 0.5 ml. ether is added. The oil which precipitates is kept in the refrigerator until it solidifies to a semicrystalline mass; and the product is collected by centrifuging, washed with ether, and recrystallized by dissolving in a few drops ethanol and adding excess ethyl acetate. The long needles thus obtained melt at 142–3° C.; and the $OCH_3$ content of the product (6.57%) agrees with that calculated for $C_{24}H_{31}O_5N_3S$ (6.55%).

EXAMPLE 3

α-methyl-d(a)-penicilloate G 1.2 g. of crystalline sodium-penicillin G (cf. the aforementioned Wintersteiner et al. patent) is dissolved in 50 ml. absolute methanol. After standing 5 days at 37° C.—during which time the $[a]_D$ drops to $+145°$—the solvent is removed by vacuum distillation, and the syrupy residue is dissolved in 5 ml. water. This solution is chilled, and 3.4 ml. of normal HCl solution is added; and the resulting precipitate is filtered off, washed with water, and immediately dissolved in a few ml. ethanol by warming slightly. The alcohol solution is chilled, water is added dropwise until the solution becomes slightly turbid, and crystallization is induced by scratching. After standing for 12–16 hours at 4° C., the product is collected by filtration, and washed with water. The product, α-methyl-d(a)-penicilloate G, melts at 125–129° C. (yield 750 mg.); and on recrystallization from aqueous methanol, hexagonal prisms melting at 133–134° C. and having an $[a]_D^{23}$ of $+105$ (0.8% solution in methanol) are obtained. Additional material recovered from the mother liquor and recrystallized raises the yield to 812 mg. (56% of the theoretical).

The speed of methanolysis is affected by the presence of small amounts of basic substances acting as catalysis. Thus, complete methanolysis is effected at room temperature in a few hours by adding to the methanol freshly-prepared sodium ethoxide in amounts corresponding to 0.02–0.01 of a molar equivalent of the penicillin salt used, or of similarly small amounts of organic bases, such as piperidine.

EXAMPLE 4

*Dimethyl d(α)-penicilloate G*

117 mg. α-methyl-d(α)-penicilloate G is dissolved in 40 ml. ether, and an ethereal solution of diazomethane is added until a slight yellow color persists. After standing for 16 hours at 4° C., the solution is evaporated to dryness in vacuo, leaving the product as a fluffy white powder (yield 123 mg.). Its analysis (C, 56.40%; H, 6.14%; and OCH₃, 15.60%) is in agreement with that calculated for $C_{18}H_{24}O_5N_2S$ (C, 56.80%; H, 6.35%; and OCH₃, 16.32%).

EXAMPLE 5

*Dimethyl d(α)-penicilloate G*

An amount of α-methyl-d(α)-penicilloate G obtainable from 2 g. crystalline sodium-penicillin G as described in Example 1 is dissolved in 50 ml. ether, and the solution is treated with a slight excess of an ethereal solution of diazomethane. After standing a short time, the reaction mixture is distilled to remove the ether, and the residue is dissolved in a small volume of acetone. To this solution, 20 ml. dry ether is added, followed by hexane until a slight turbidity persists.

Crystallization then commences, and is furthered by the gradual addition of more hexane. After standing 24 hours at refrigerator temperature, the crystalline (but somewhat gummy) product is collected, washed with a mixture of ether and hexane, and dried (yield 1.33 g.). After two recrystallizations from a mixture of ether and hexane, the product melts at 84–88° C., and has an $[\alpha]_D^{23}$ of +85.8° (in methanol).

Following the procedure described in Example 1 (or 3) but substituting another alcohol for the methanol (e. g., absolute ethanol or benzyl alcohol), the corresponding α-ester is obtained. Following the procedure described in Example 2 but substituting ammonia or some other amine (e. g., ethylamine or diethylamine) for the benzylamine, the corresponding ammonium salt of the α-methyl (or other hydrocarbon) ester is formed; and following the procedure described in Example 4 (or 5) but substituting another esterifying agent for the diazomethane (e. g., phenyl-diazomethane), the corresponding derivative of the α-methyl (or other hydrocarbon) ester is formed.

The invention may be variously otherwise embodied within the scope of the appended claims.

I claim:
1. The compound of the formula

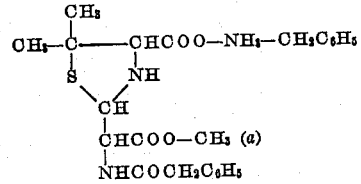

wherein the penicilloic acid residue is of the particular stereoisomeric form mainly resulting on alcoholysis of penicillin G.

2. The beta-benzyl amine salt of alpha-methyl-d-alpha benzylpenicilloate of the formula:

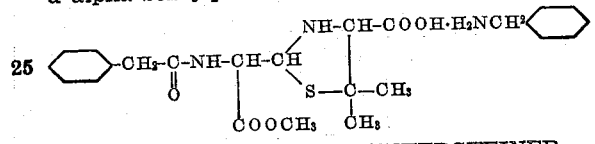

OSKAR WINTERSTEINER.

REFERENCES CITED

The following references are of record in the file of this patent:

UNITED STATES PATENTS

| Number | Name | Date |
| --- | --- | --- |
| 2,394,967 | Kushner | Feb. 12, 1946 |

OTHER REFERENCES

Abraham, British Journal of Experimental Pathology, vol. 23, June 1942, No. 3, pages 103–122.

Summary of Structure Studies on Penicillin, Nov. 1943, Merck & Co., 22 p.

Squibb Report CMR-S-1, Dec. 20, 1943, p. 8 (Dutcher et al.).

Merck Report CMR-M-VI (PB 80059) dated Dec. 1943, p. 4 (date considered to be Jan. 1, 1944).

Abbott Report, CMR-A-III, Feb. 14, 1944, page 3.

Abbott Report, A-16, Dec. 15, 1944, page 4.

Upjohn Report U-16, Dec. 16, 1944, pp. 3 and 7, CPS No. 381.

Fleming, "penicillin," (1946), page 29.